(12) United States Patent
Ochi et al.

(10) Patent No.: US 7,684,290 B2
(45) Date of Patent: Mar. 23, 2010

(54) OBJECT LENS ACTUATOR

(75) Inventors: Manabu Ochi, Fujisawa (JP);
Katsuhiko Kimura, Kasumigaura (JP);
Hidenao Saito, Yokohama (JP); Jun Hato, Yokohama (JP)

(73) Assignee: Hitachi Media Electronics Co., Ltd. (JP)

( * ) Notice: Subject to any disclaimer, the term of this patent is extended or adjusted under 35 U.S.C. 154(b) by 660 days.

(21) Appl. No.: 11/527,412

(22) Filed: Sep. 27, 2006

(65) Prior Publication Data

US 2007/0079316 A1    Apr. 5, 2007

(30) Foreign Application Priority Data

Sep. 30, 2005    (JP)    ............... 2005-287931

(51) Int. Cl.
    *G11B 7/00*    (2006.01)
(52) U.S. Cl. .................................. 369/44.14
(58) Field of Classification Search ........... None
    See application file for complete search history.

(56) References Cited

U.S. PATENT DOCUMENTS 5,488,603 A * 1/1996 Tomita et al. ............... 720/683

5,808,999 A * 9/1998 Yagi ...................... 369/112.26

FOREIGN PATENT DOCUMENTS

| JP | 09-198682 | 7/1997 |
| JP | 10-289453 | 10/1998 |
| JP | 2002-358675 | 12/2002 |
| JP | 2004-178658 | 6/2004 |

OTHER PUBLICATIONS

"Introduction of Mode Analysis" author is Akio Nagamatsu published by Gakujyutsu bunken fukyukai in Jul. 1993.

* cited by examiner

*Primary Examiner*—Peter Vincent Agustin
*Assistant Examiner*—Aneeta Yodichkas
(74) *Attorney, Agent, or Firm*—Antonelli, Terry, Stout & Kraus, LLP.

(57) ABSTRACT

In an object lens actuator, stiffness of a lens holder is improved and the higher order resonance frequency is sufficiently increased. The stiffness of the lens holder is improved by providing a flat plate perpendicular to the focusing direction between the side wall of a lens holding part and the outer sidewall along the tracking direction at approximately the middle of both ends of the lens holder along the focusing direction.

1 Claim, 5 Drawing Sheets

(PRESENT INVENTION)

(CONVENTIONAL EXAMPLE)

$\delta < \Delta$

FIG. 6

| MODE OF VIBRATION | (a) | (b) | (c) |
|---|---|---|---|
| CONVENTIONAL EXAMPLE | 31 kHz | 30 kHz | 56 kHz |
| FIRST EMBODIMENT | 34 kHz | 36 kHz | 58 kHz |
| SECOND EMBODIMENT | 34 kHz | 44 kHz | 59 kHz |

MODE OF VIBRATION (a)

MODE OF VIBRATION (b)

MODE OF VIBRATION (c)

OBJECT LENS ACTUATOR

BACKGROUND OF THE INVENTION

1. Field of the Invention

The present invention relates to an object lens actuator used in an optical disc drive that writes/reads information in/from an optical disc. Particularly, the invention relates to an object lens actuator in which the stiffness of an object lens holder is improved.

2. Background Art

In an optical disc write/read drive that writes/reads information in/from a disc-type information recording medium, attempts have been made to improve the data transfer speed by spinning the disc at high speed. In order to accurately write/read information in/from the rapidly spinning optical disc, such optical disc write/read drive mounts an object lens actuator that drives an object lens in the focusing direction and the tracking direction so that the lens follows a recording surface of the optical disc.

A general object lens actuator comprises a magnetic circuit composed of a yoke and a permanent magnet, a movable lens holder that holds an object lens, a fixed part that holds the lens holder, and a support member that elastically supports the lens holder with the fixed part. A focusing coil and a tracking coil are attached to the lens holder, and when a current is caused to flow through the focusing coil, the lens holder is caused to be driven in the focusing direction due to electromagnetic force produced by the effect of magnetic flux from the permanent magnet attached to the yoke. Similarly, when a current is caused to flow through the tracking coil, the lens holder is caused to be driven in the tracking direction due to electromagnetic force produced by the effect of magnetic flux from the permanent magnet attached to the yoke.

In such object lens actuator that performs the positioning of an object lens, it is necessary to increase the control band for focusing and tracking as the number of rotations of the optical disc is increased. Further, in order to realize stable control, it is necessary to increase the higher order resonance frequency of the object lens actuator. Since the higher order resonance of the object lens actuator is due to the elastic vibration of the lens holder, in order to increase the higher order resonance frequency, it is necessary to improve the stiffness of the lens holder.

Patent Document 1 discloses a method for improving the stiffness of such lens holder by coupling a lens holding part and a coil placing part with each other with thin-wall reinforcement ribs and plugging at least a part of the opening parts on the side of the upper end face of the space surrounded by the outside part of the lens holding part, the coil placing part, and the reinforcement ribs, with a thin plate. In the object lens holder disclosed in Patent Document 1, it is considered that a lighter lens holder can be obtained and the higher order resonance frequency of the lens holder can be increased by making the reinforcement ribs thin-walled and by making the plate for plugging the opening parts on the side of the upper end face thin.

Patent Document 1: JP Patent Publication (Kokai) No. 9-198682 A (1997) (claim 1, FIG. 1, and the like)

SUMMARY OF THE INVENTION

Generally, the lens holder of an object lens often has a box-like

Generally, the lens holder of an object lens often has a box-like shape with the open bottom surface (end surface on the far side of the object lens). In such lens holder, the mode of vibration of higher order resonance appears as a vibration by which the bottom surface of the outer sidewall of the lens holder becomes deformed. FIG. 7 shows examples of the mode of vibration involving such deformation of the lens holder bottom surface of an object lens. In the above conventional technology, flat plate for plugging opening parts on the upper surface (end surface on the near side of the object lens) is provided. However, with such constitution, if the measurement of the lens holder in height (the measurement along the optical axis direction of the object lens) is large, side walls vibrate with the above flat plate as a fixed end, thereby causing a problem that sufficient stiffness cannot be obtained.

The present invention has been made in view of such circumstances, and it is an object of the invention to provide an object lens actuator wherein the stiffness of the lens holder is improved and the higher order resonance frequency is sufficiently increased.

As a result of intensive studies in view of the above problems to be solved, the present inventor has arrived at a constitution that improves the stiffness of the lens holder by providing a flat plate perpendicular to the focusing direction between the side wall of the lens holding part and the outer sidewall along the tracking direction at approximately the middle of both ends of the lens holder along the focusing direction.

Namely, the present invention provides an object lens actuator that drives an object lens for performing the writing/reading on a recording surface of an optical disc in the focusing direction and the tracking direction. A lens holder for holding the object lens comprises a hollow side wall extending along the focusing direction and a hollow lens holding part extending along the focusing direction on the inner side of the side wall. A flat plate substantially parallel to the tracking direction for connecting to both the side wall and the lens holding part is provided not in the vicinity of both ends along the focusing direction.

In the object lens actuator of the present invention, the lens holder is supported by support members fixed on the outer surface of the side wall, and the location of the flat plate along the focusing direction is near the support member fixing location of the lens holder. Alternatively, among a plurality of different support member fixing locations, the location of the flat plate along the focusing direction is preferably between the support member fixing location closest to one end of the lens holder and the support member fixing location closest to the other end of the lens holder. Alternatively, the location of the flat plate along the focusing direction may be approximately the middle of the lens holder.

In the object lens actuator of the present invention, the flat plate has at least two through-holes at locations symmetrical with respect to the center axis of the lens holder along the focusing direction. During assembly of the object lens actuator, if rod-shaped members are run through these through-holes, the lens holder can be easily held.

In the object lens actuator of the present invention, the lens holding part comprises an aperture stop at an inner periphery part near the end opposite to the end that holds the object lens along the focusing direction.

The present invention provides an object lens actuator that drives an object lens for performing the writing/reading on a recording surface of an optical disc in the focusing direction and the tracking direction. The lens holder that holds the object lens comprises a hollow side wall extending along the focusing direction and a hollow lens holding part extending along the focusing direction on the inner side of the side wall. The lens holding part has an aperture stop at an inner periphery part near the end opposite to the end that holds the object lens along the focusing direction.

Thus, as described above, in accordance with the present invention, an object lens actuator in which the stiffness of the lens holder is improved is provided, by providing a flat plate perpendicular to the focusing direction between the side wall of the lens holding part and the outer sidewall along the tracking direction at approximately the middle of both ends of the lens holder along the focusing direction. Further, by providing the flat plate near the support member fixing points of the lens holder, vibration of the support member fixing parts induced by the weight of solder applied to the support member fixing parts is suppressed. Further, by providing the flat plate at approximately the middle of the lens holder along the focusing direction, the stiffness of the lens holder can be further improved.

Furthermore, by forming at least two holes (through-holes) in the flat plate and holding the lens holder by running pins through these holes during assembly or adjustment, the lens holder can be stably fixed, thereby improving assembly accuracy. Further, by providing an aperture stop near a lower end of the lens holding part of the lens holder, the stiffness of the lower part of the lens holder is further improved and the weight of the object lens at the upper part of the lens holding part is counterbalanced, whereby the drive of the lens holder via a tracking coil disposed at approximately the center of a lens holder side surface is stabilized.

BRIEF DESCRIPTION OF THE DRAWINGS

FIG. 6 shows results of a vibration test on the lens holders of the object lens actuators according to the first and second embodiments and a conventional example.

DESCRIPTION OF PREFERRED EMBODIMENTS OF THE INVENTION

Figure 1:
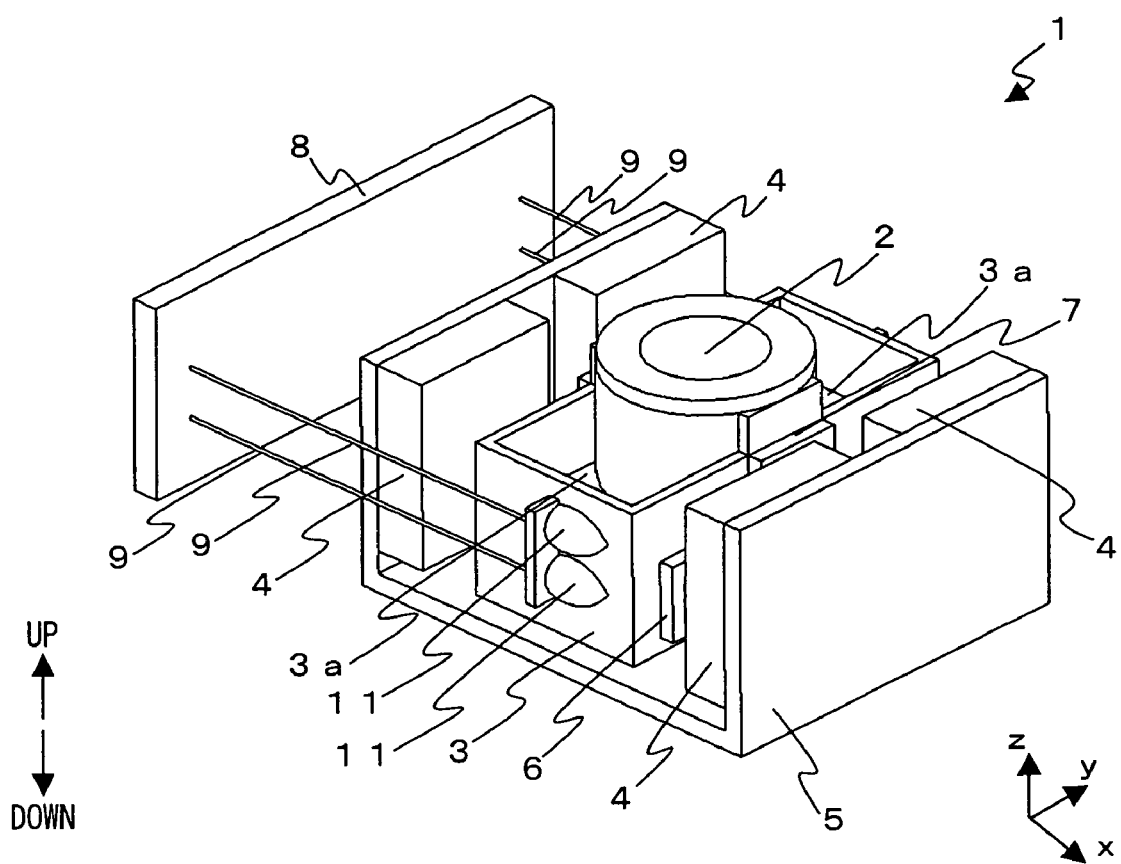
FIG. 1 schematically shows a perspective view of the overall constitution of an object lens actuator of the present invention.

Hereafter, preferred embodiments of an object lens actuator of the present invention will be described in detail with reference to the attached the present invention. In these diagrams, parts denoted by identical reference numerals represent identical parts, and the fundamental constitution and operation thereof are the same.

First Embodiment

FIG. 1 schematically shows a perspective view of the overall constitution of an object lens actuator according to a first embodiment. In the following, the x-axis direction shown in each figure refers to a tangential direction of the circumference of an optical disc not shown, the y-axis direction refers to the tracking direction, which is a radial direction of the optical disc, and the z-axis direction refers to the focusing direction, which is the optical axis direction of the object lens. Furthermore, the direction in which the object lens moves closer to the optical disc not shown and the direction in which the object lens moves away from the optical disc not shown are defined as the upward direction and the downward direction, respectively.

In FIG. 1, an object lens actuator 1 comprises an object lens 2, a lens holder 3 that holds the object lens 2, a fixed part 8 that holds the lens holder 3, support members 9 that elastically support the lens holder 3 with the fixed part 8, permanent magnets 4, and a yoke 5. The object lens 2 is mounted on the upper surface of the lens holder 3. The lens holder 3 mounts a pair of focusing coils 6 and a tracking coil 7 on each of the two side surfaces perpendicular to the x-axis direction. One end of each wire-type support member 9 is fixed in the vicinity of an edge surface of the fixed part 8 and the other end is fixed on support member fixing parts 3d of the lens holder 3 via solder 11. In this object lens actuator 1, the lens holder 3 that holds the object lens 2, the focusing coils 6, and the tracking holder 3 that holds the object lens 2, the focusing coils 6, and the tracking coils 7 are moving parts that move with respect to the fixed part 8.

Figure 2:
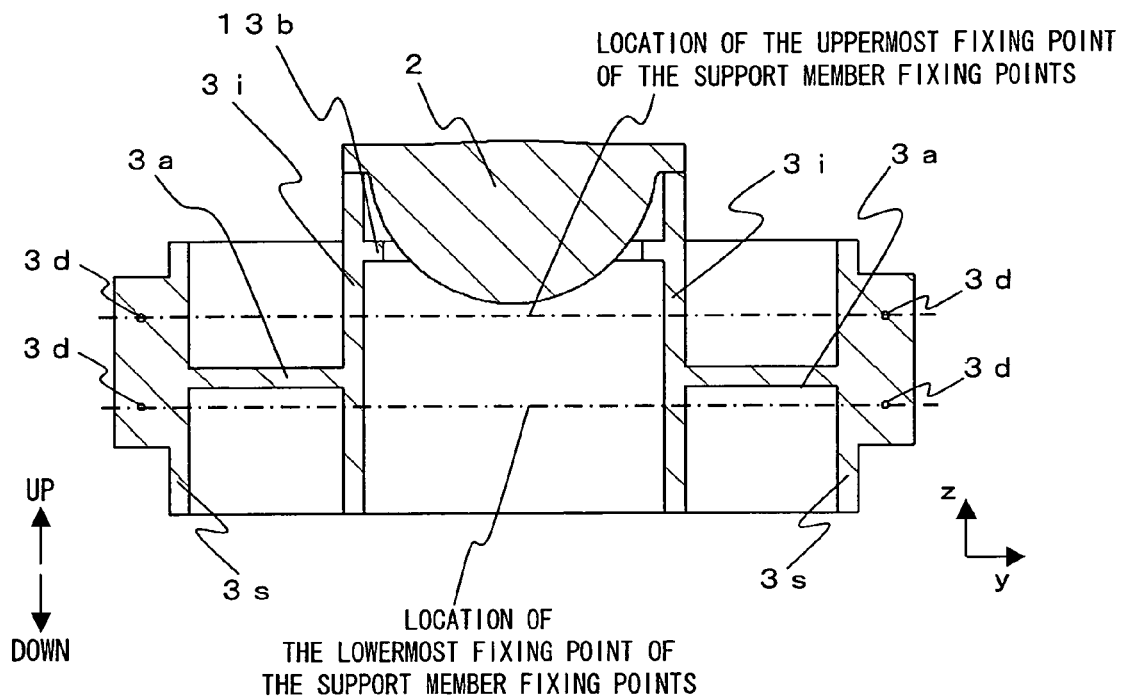
FIG. 2 shows a cross-sectional view of an object lens and a lens holder of the object lens actuator according to a first embodiment in a plane perpendicular to an x-axis direction.

Next, the internal shape of the object lens 2 and the lens holder 3 of the object lens actuator shown in FIG. 1 will be described. FIG. 2 shows a cross-sectional view of the object lens 2 and the lens holder 3 in a plane perpendicular to the x-axis direction. In FIG. 2, the lens holder 3 has a cylindrical lens holding part 3i centered on the z-axis direction and an outer sidewall 3s centered on the same axis. The lens holding part 3i and the outer sidewall 3s are connected via a flat plate 3a parallel to the x-y plane. In the cross section of the lens holder shown in FIG. 2, among individual pairs of fixing points 3d that fix the lens holder 3 and the support member 9 located at different heights along the z-axis direction, the position of the flat plate 3a along the z-axis direction is higher than one pair of fixing points and lower than the other pair. Further, an aperture stop 13b is formed near the end part of the lens holding part 3i that holds the object lens 2.

Figure 3:
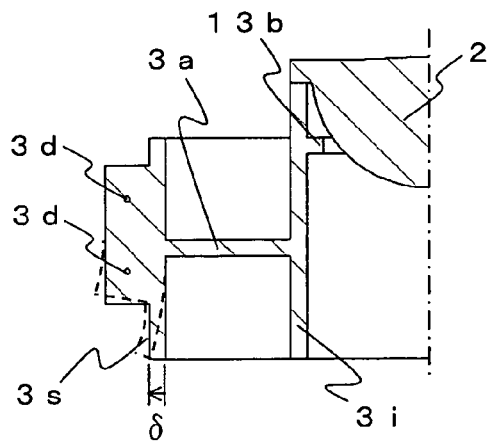
FIG. 3 shows a partially enlarged view of a cross section of the object lens and the lens holder shown in FIG. 2 in a plane perpendicular to the x-axis direction. A similar cross-sectional view of a conventional object lens and lens holder is also shown for comparison.
Figure 3:
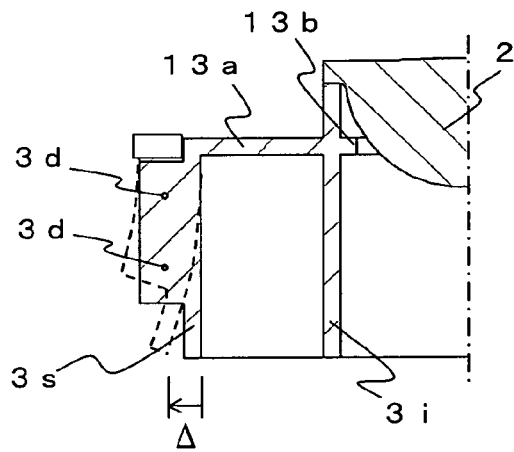

FIG. 3 shows a partially enlarged view of a cross section of the object lens 2 and the lens holder 3 shown in FIG. 2 in a plane perpendicular to the x-axis direction. A similar cross-sectional view of a conventional object lens and lens holder is also shown for comparison. As shown in FIG. 2, while, in a conventional example, the flat plate 3a that connects the lens holding part 3i of the lens holder 3 to the outer sidewall 3s is formed near the upper end of the lens holder 3 along the axial direction (z-axis direction), in the object lens actuator of the present embodiment, the flat plate 3a connecting to both the lens holding part 3i of the lens holder 3 and the outer sidewall 3s is formed at approximately the middle of the lens holder 3 along the axial direction. In this way, in the object lens actuator of the present embodiment, stiffness can be improved against deformation of the lens holder 3, which is the mode of vibration of higher order resonance, since the degree of deformation of the lower opening end of the outer sidewall 3s of the lens holder 3 can be reduced.

Further, while the vibration by which the lower opening end of the outer sidewall 3s of the lens holder 3 is deformed will be increased due to the weight of the solder 11 applied to the support member fixing part 3d, by forming the flat plate 3a near the support member fixing part 3d as described above, such influence due to the weight of the solder 11 is reduced, thereby improving the stiffness of the lens holder 3. Preferably, the stiffness of the lens holder 3 can be further improved by providing the flat plate 3a near the middle of the length of the outer sidewall 3s of the lens holder 3 along the z-axis direction.

In the object lens actuator of the present embodiment, the flat plate 3a does not necessarily need to be disposed as described above. For example, the flat plate 3a may be provided at an arbitrary place a little apart from the upper end and the lower end of the outer sidewall 3s of the lens holder 3. With such constitution, too, it is possible to obtain the effect of improving the stiffness of the lens holder 3, as compared with the conventional example shown in FIG. 3 where the flat plate 13a is provided at the upper end of the outer sidewall 3s of the lens holder 3.

Second Embodiment

Figure 4:
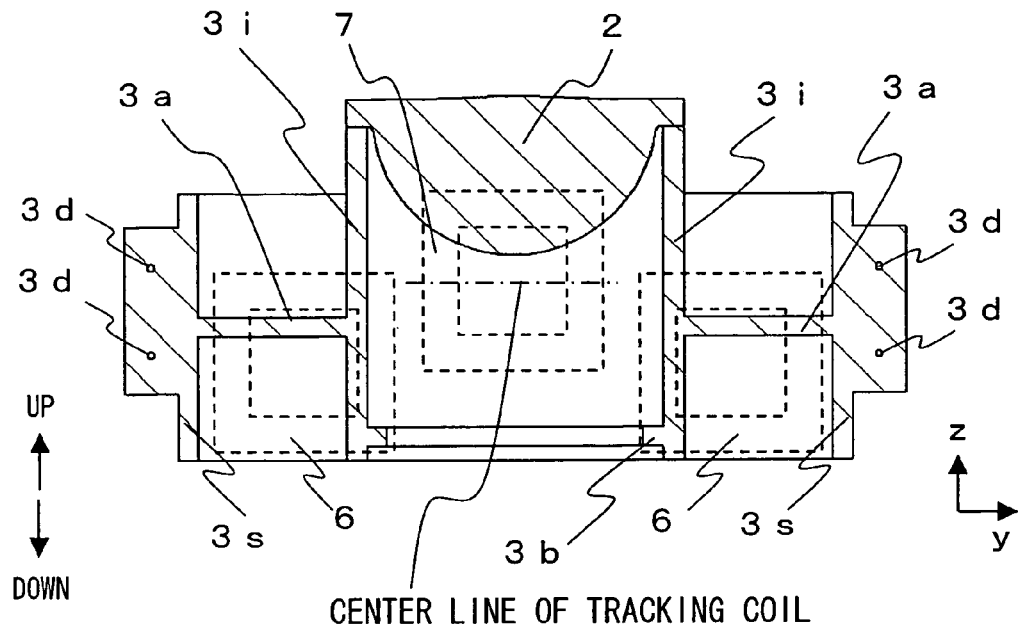
FIG. 4 shows a cross-sectional view of an object lens and a lens holder of an object lens actuator according to a second embodiment in a plane perpendicular to the x-axis direction.

Next, an object lens actuator of a second embodiment of the present invention will be described. The overall constitution of the object lens actuator of the present embodiment is similar to that shown in FIG. 1, and the internal shape of the lens holder 3, which is a characterizing portion, will be hereafter described in detail. FIG. 4 shows a cross-sectional view of an object lens 2 and a lens holder 3 of an object lens actuator according to the present embodiment in a plane perpendicular to the x-axis direction. In FIG. 4, the lens holder 3 comprises an aperture stop 3b near the lower end part of the lens holding part 3i, in addition to the same constitution as that of the first embodiment shown in FIG. 2. The aperture stop 3b is formed at a position lower than the center of the core of the tracking coil 7 mounted on the side surface of the lens holder 3.

In the thus constructed object lens actuator of the present embodiment, the stiffness of the lower part of the lens holder 3 is improved, as compared with the constitution in which the aperture stop 3b is not mounted near the lower end part of the lens holding part 3i. Further, by providing the aperture stop 3b near the lower end part of the lens holding part 3i, the weight of the lower part of the lens holder 3 is increased and the weight of the object lens 2 is counterbalanced, whereby the center of the total gravity of the object lens 2 and the lens holder 3 becomes close to the center of the length of the lens holder 3 along the z-axis direction. In other words, since the center of the total gravity of the object lens 2 and the lens holder 3 becomes close to the center of the core of the tracking coil 7 that drives them, when the object lens 2 is driven in the tracking direction, stable operation can be achieved.

Third Embodiment

Figure 5:
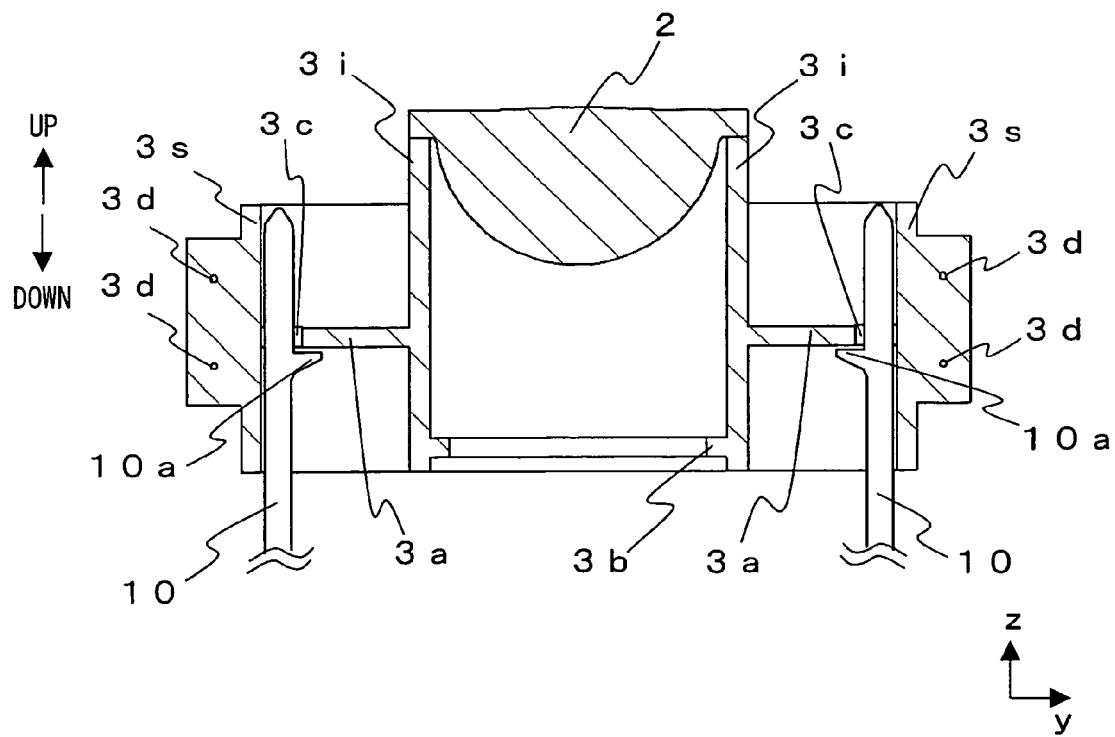
FIG. 5 shows a cross-sectional view of an object lens and a lens holder of an object lens actuator according to a third embodiment in a plane perpendicular to the x-axis direction.

Next, an object lens actuator of a third embodiment of the present invention will be described. The overall constitution of the object lens actuator of the present embodiment is similar to that shown in FIG. 1, and the internal shape of the lens holder 3, which is a characterizing portion, will be hereafter described in detail. FIG. 5 shows a cross-sectional view of an object lens 2 and lens holder 3 of an object lens actuator according to a present embodiment in a plane perpendicular to the x-axis direction. In FIG. 5, in the cross section shown, the lens holder 3 has a pair of holes 3c that run through both sides of the flat plate 3a, in addition to the same constitution as that of the second embodiment shown in FIG. 4. The location and the shape of this pair of holes 3c are substantially symmetrical with respect to the optical axis of the object lens 2. Alternatively, three or more holes substantially symmetrical with respect to the optical axis of the object lens 2 may be formed. A pair of pins 10 are individually run through the pair of holes 3c, and the lens holder 3 can be held by stoppers 10a formed on the pins 10.

In the thus constructed object lens actuator of the present embodiment, the lens holder 3 can be prevented from being obliquely fixed by stably holding the lens holder 3 with the pins 10 during assembly or adjustment. Further, during assembly or adjustment, since the lens holder 3 can be held by the stoppers 10a of the pins 10, it becomes easier to position the lens holder 3 along the z-axis direction. Thus, the assembly accuracy of the lens holder 3 can be improved when the manufacturing the object lens actuator and the like.

EXAMPLE

Figure 7:
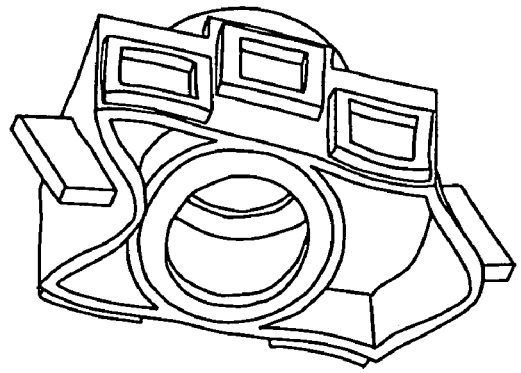
FIG. 7 shows examples of the mode of vibration involving deformation of the bottom surface of a lens holder of a conventional object lens.
Figure 7:
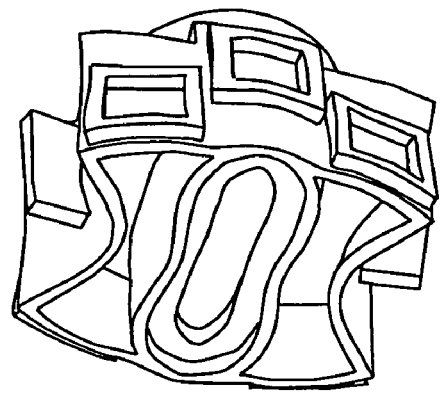
Figure 7:
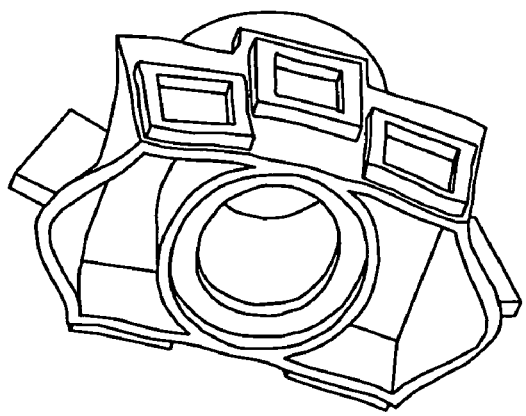

A vibration test was carried out on lens holders of the object lens actuators of the first embodiment, the second embodiment, and the conventional example. FIG. 6 shows the results. In the vibration test, a frequency where the gain of the frequency response function, which is the ratio of response to excitation, reached the peak was measured (refer to Patent Document 1 (FIG. 13 and the like) or Akio Nagamatsu, *Mode Analysis*, (Gakujutsu Bunken Hukyukai Foundation, 1993), pp. 66-67, for example, for details of the measuring method). In FIG. 6, the modes (a) to (c) of vibration correspond to the modes (a) to (c) of vibration of the lens holder shown in FIG. 7.

Based on the results of the vibration test, it can be seen that the resonance frequencies of the object lens actuators of the first and second embodiments are higher than that of the conventional example, with respect to all the modes (a) to (c) of vibration. Further, as the effect of the improved stiffness of the lower part of the lens holder 3 in the object lens actuator of the second embodiment, the resonance frequency with respect to the mode (b) of vibration is particularly increased.

While the object lens actuator of the present invention has been described with specific embodiments, the present invention is not limited thereto. One skilled in the art can make various changes or modifications to the inventive constitution and function of each of the above embodiments or other embodiments without departing from the scope of the invention.

What is claimed is:

1. An object lens actuator that drives an object lens for performing the writing/reading on a recording surface of an optical disc in a focusing direction and a tracking direction, comprising:
   a lens holder that holds the object lens;
   a tracking coil mounted with respect to the lens holder;
   a hollow side wall extending along the focusing direction; and
   a hollow lens holding part extending along the focusing direction on an inner side of the hollow side wall;
   wherein the hollow lens holding part comprises an aperture stop at a position lower than a center of a core of the tracking coil along the focusing direction.

* * * * *